(12) United States Patent
Perez Donoso et al.

(10) Patent No.: US 9,732,272 B2
(45) Date of Patent: Aug. 15, 2017

(54) SYNTHESIS OF HIGHLY FLUORESCENT GSH-CDTE NANOPARTICLES (QUANTUM DOTS)

(71) Applicant: Universidad de Santiago de Chile, Santiago (CL)

(72) Inventors: Jose Manuel Perez Donoso, Santiago (CL); Juan Pablo Monras Charles, Santiago (CL); Igor Orlando Osorio-Roman, Santiago (CL); Claudio Chrisitan Vasquez Guzman, Santiago (CL)

(73) Assignee: Universidad de Santiago de Chile (CL)

( * ) Notice: Subject to any disclaimer, the term of this patent is extended or adjusted under 35 U.S.C. 154(b) by 714 days.

(21) Appl. No.: 13/929,484

(22) Filed: Jun. 27, 2013

(65) Prior Publication Data

US 2013/0284979 A1    Oct. 31, 2013

Related U.S. Application Data

(63) Continuation of application No. PCT/IB2011/055976, filed on Dec. 27, 2011.

(30) Foreign Application Priority Data

Dec. 28, 2010  (CL) .................................. 1596-2010

(51) Int. Cl.
| | |
|---|---|
| *C09K 11/02* | (2006.01) |
| *C09K 11/88* | (2006.01) |
| *B82Y 40/00* | (2011.01) |

(52) U.S. Cl.
CPC ............ *C09K 11/88* (2013.01); *C09K 11/025* (2013.01); *C09K 11/883* (2013.01); *B82Y 40/00* (2013.01);
(Continued)

(58) Field of Classification Search
CPC ....... C09K 11/02; C09K 11/883; C09K 11/88; B82Y 40/00; Y10S 977/896; Y10S 977/774; Y10S 977/95
See application file for complete search history.

(56) References Cited

U.S. PATENT DOCUMENTS

2008/0246006 A1    10/2008 Ying et al.

FOREIGN PATENT DOCUMENTS

| WO | 2006104464 A1 | 10/2006 |
| WO | 2007102799 A2 | 9/2007 |

(Continued)

OTHER PUBLICATIONS

PCT "International Search Report and PCT Written Opinion of the International Search Authority" dated Apr. 4, 2012 for International Application No. PCT/IB2011/055976, WO 2012/090161 A1 published Jul. 5, 2012 of Universidad de Santiago de Chile.

*Primary Examiner* — Carol M Koslow
(74) *Attorney, Agent, or Firm* — Tolpin & Partners, PC; Thomas W. Tolpin

(57) ABSTRACT

The invention relates to a method for the synthesis of glutathione-capped cadmium-telluride (GSH-CdTe) quantum dots in an aqueous medium, including the steps of: a) preparing a precursor solution of cadmium in a citrate buffer; b) adding glutathione (GSH) to the preceding mixture via strong agitation; c) adding a telluride (potassium or sodium telluride) oxyanion as a telluride donor to the preceding mixture; d) allowing the preceding mixture to react; and e) stopping the reaction by incubation at low temperature.

4 Claims, 3 Drawing Sheets
(2 of 3 Drawing Sheet(s) Filed in Color)

(52) U.S. Cl.
CPC ........ *Y10S 977/774* (2013.01); *Y10S 977/896* (2013.01); *Y10S 977/95* (2013.01)

(56) References Cited

FOREIGN PATENT DOCUMENTS

| | | |
|---|---|---|
| WO | 2008133598 A1 | 11/2008 |
| WO | 2012090161 A1 | 7/2012 |

SYNTHESIS OF HIGHLY FLUORESCENT GSH-CDTE NANOPARTICLES (QUANTUM DOTS)

FIELD OF APPLICATION

The present invention refers to a method of synthesis of quantum dots (QDs) which comprise CdTe and a gluthatione cover (GSH). The synthesis is produced at low temperatures, in the presence of oxygen, and by using biocompatible substrates. The precursors which are used in the synthesis are inexpensive compounds as tellurium oxyanions and cadmium salts, whilst the GSH is used as a stability and reducing agent. The quantum dots (QDs) can be synthesized with different buffers at different pHs, temperatures, precursor molecules and concentrations generating different sizes and spectroscopic characteristics. Nanoparticles synthesized by the described method display sizes which vary in the 3-6 nm range in diameter, with a quantum yield up to 30%. Based on these characteristics, the QDs generated by this method are useful in electronic and optoelectronic applications, solar cells, as bioprobes and in bioimaging, among many other uses.

DESCRIPTION OF THE PRIOR ART

During the last decades there has been a great interest to develop and to optimize semiconductor materials, making them more efficient and less harmful to the environment. In this context, it has been described the preparation of quantum dots (QDs), that are colloidal nanocrystal semiconductors with particle sizes varying between 2 and 20 nm. QDs have different characteristics and display great advantages regarding usually employed semiconductor materials. Among these, it can be highlighted that their size and composition determines the fluorescent emission spectrum of the particle, allowing the generation of quantum dots of desired fluorescence requirements in addition to their very high structural and spectroscopic stability.

From the structural point of view, QDs are composed by a center or "core" and a cover, cap or "shell", which is formed by different semiconductor materials. Additionally, different types of semiconductor shell coverings have been included in this basic structure in order to improve functional characteristics.

For example, a second protective layer, formed by polymers or silicates, which permits increasing stability, biocompatibility, optical properties and/or the affinity for different molecules, cells or objects has been informed. However, notwithstanding that the addition of these shells allows getting better QDs properties, it could affect some other properties due to the possibility of increasing nanoparticle size and/or agglomeration, affecting their stability, fluorescence and solubility. On the other hand, sometimes the shell affects fluorescent properties, drastically reducing the quantum yield.

Among the elements that can constitute the QDs' "core", the most required are nanostructured compounds of cadmium/telluride, which have different applications in nanotechnology. CdTe displays cubic crystalline structure that allow it to function as a semiconductor as well as to be a powerful material for thin solar cells and infrared or X rays/gamma rays detectors [in alloys with mercury (HgCdTe) or zinc (CdZnTe)]. In the case of CdTe QDs, an alternative that has allowed increasing its use in different applications has been the inclusion of thiols as shells. In this regard, different methods have been developed for CdTe nanoparticle synthesis using thiols as mercapto succinic acid (MSA), thioglycolic acid (TGA), cysteine, and gluthatione (GSH), among others.

Quantum dots that have been synthesized in the presence of thiols display good quantum yields, are highly fluorescent and very useful in applications in biomedicine and bioenergy. In addition, the presence of thiols reduces nanoparticle oxidation, probably as consequence of decreased $Cd^{+2}$ content in the core or shell of the QDs.

During the last ten years, many methods for synthesizing CdTe quantum dots have been described, comprising mainly organic synthesis processes. However, their application to biological systems is complex because of nanoparticle hydrophobic characteristics. Regarding this point, the aqueous synthesis of these molecules offers some advantages regarding the organic synthesis, as low toxicity, simplicity, high reproducibility, and their potential use in biological systems when bonded to compatible thiols.

Notwithstanding these advantages, currently there exist only a few protocols which have been developed for the aqueous synthesis of thiol-containing CdTe nanoparticles. In this context, synthesis methods based on the use of NaHTe or $H_2Te$ as Te donor, and cadmium chloride as the $Cd^{2+}$ donor have been described (Qian et al., 2006; Zheng et al., 2008). In them, the reaction is carried out at high temperatures (90-130° C.) (Qian et al., 2006; Ma et al., 2007; Guo et al., 2005) at a relatively basic pHs (Qian et al., 2006; WO2006/104464), and uses the thiol glutathione (GSH). A relevant characteristic of these methods is the use of NaHTe as Te donor, a requirement to produce the $Te^{-2}$ precursor, which is highly unstable and requires using special equipment. When using $H_2Te$, the synthesis procedure also requires many safety conditions, since this molecule is a highly toxic gas. Other characteristics of protocols that are different from the one being presented is the use of high temperatures, $N_2$ or Ar atmospheres and capping agents based on thiols different to GSH. All these differences and the consideration that CdTe-GSH NPs synthesis is carried out in aqueous solutions, make the method described here different from prior art methods. Also, the produced NPs display better properties for interaction with biological systems (biocompatibility) and, as consequence, increased potential applications in biomedicine and biotechnology.

An alternative to current synthesis methods, involves the use of less toxic and/or stable tellurium donors, as sodium or potassium telurite ($Na_2TeO_3$ or $K_2TeO_3$, respectively). However, according to the protocols described in the literature, it is still necessary to add a strong reducing agent, as $NaBH_4$, and conduct the reaction at temperatures over 100° C. (Bao et al., 2006; Ying et al., 2008). In this particular case, $NaBH_4$ reduces $TeO_3^{2-}$ to $Te^{2-}$ which finally reacts with $Cd^{2+}$ to generate the CdTe nanocrystals. Nevertheless, citrate salts must be added in the process to avoid $CdTeO_3$ precipitation, and therefore the procedure is not efficient. Furthermore, in these protocols the most common thiols used are mercarp to succinic acid (Ying et al., 2008, Ma et al., 2007) and cysteine (Bao et al, 2006), which provide different properties to the quantum dots, specially in terms of the interaction with biological systems. Finally, and as mentioned above, the use of a strong reducing agent as $NaBH_4$, and the application of high temperatures, reflux conditions and the condensation of the synthesis mixture, are essential conditions in the method of the synthesis, purity, and putative product applications In publication Qiang H. et al (2006) "Facile One-Plot Synthesis of Luminescent, Water-Soluble, and Biocompatible glutathione, Coated CdTe Nanocrystals". Small 2 (6):

747-751, a synthesis protocol of cadmium-tellurium quantum dots is described based on the use of $CdCl_2$ as a cadmium donor, glutathione (GSH) as stabilizer and the NaHTe gas as tellurium donor. The reaction is conducted at elevated temperatures in the absence of oxygen, and at a basic pH.

As a difference with the protocol of D1 document, in this application a tellurium oxyanion as a Te donor is used, and the reaction can be conducted at lower temperatures. The relevance of these differences consists in that the NaHTe gas is a toxic, that must be synthesized and handled under high safety conditions.

Based on the above considerations, the method of the present invention differs with that of D1 document and thus is considered of novelty.

Ying E, et al., (2008): "Synthesis and Bio-Imaging Application of Highly Luminescent Mercaptosuccinic Acid-Coated CdTe Nanocrystals". PLOS ONE 3 (5): e2222, describes a method for cadmium-tellurium QDs synthesis It is based in using $CdCl_2$ and $Na_2TeO_3$ as cadmium and tellurium donors, respectively. To generate a tellurium ion able to react with cadmium to produce nanoparticles, the strong reducing agent $NaBH_4$ is required to reduce $TeO_3^{2-}$ to $Te^{2-}$, which in turn will react with $Cd^{2+}$ to produce CdTe nanocrystals. Finally, the authors use mercaptosuccinic acid for QDs covering.

As a difference with the protocol of the present application, the authors of this document, D2, declare that an essential feature of their methods the use of a strong reducing agent such as $NaBH_4$, as well as high temperatures, reflux conditions and condensation of the synthesis mixture, making the synthesis difficult, decreasing the purity and eventual use of the products. Furthermore, the authors describe that citrate salts must be added to avoid $CdTO_3$ precipitation. This is another important difference with the protocol of this application, where synthesis is possible using different buffers.

Furthermore, in the present invention it is described that glutathione is used instead of $NaBH_4$, which acts as a reducing agent and taking part of the NP shield, thus permitting its use in biological systems. Finally and according to the protocol described in the present invention, high temperatures are not necessary high, nor refluxing or condensation of the synthesis mixture. In this context, it is considered that the protocol of the present application is different and therefore novel regarding the D2 document.

Bao H., et al., (2006). "One-Pot Synthesis of CdTe Nanocrystals and Shape Control of Luminescent CdTe-Cysteine Nanocomposites". Small 2(4): 476-480, describes a method for synthesizing CdTe quantum dots, based in using $CdCl_2$ as cadmium donor. For generating the telluride ion able to react with cadmium, $NaBH_4$ is used to reduce $TeO_3^{2-}$ to $Te^{2-}$, which in turn reacts with $Cd^{2+}$ to produce the nanocrystals of CdTe. Finally, the authors use cysteine for QD coating.

As a difference with the protocol described in the present application, the authors indicate that one of the essential elements of their procedure is the use of sodium borohydride as an agent able to reduce the tellurium oxyanion (in this case, $Na_2TeO_3$. Furthermore, according to the protocol it is necessary to use high temperatures, reflux conditions as well as to condense the synthesis mixture, features that make the synthesis difficult, decreasing the purity, and eventual product applications. It also considers the use of citrate buffer to avoid $CdTeO_3$ precipitation.

In the current invention it is stated that glutathione can be used instead of $NaBH_4$, which performs a double function, acting as a reducing agent, and becoming part of NP shell. Also, high temperatures are not required nor refluxing or condensing. It is also possible to use different reaction buffers. Based on these facts, it is considered that the protocol referred in D3 document, is different as compared to that of the current application, and therefore novel.

Ma. J., et al., (2007) "Photochemical Instability of Thiol-Capped CdTe Quantum Dots in Aqueous Solution and Living Cells: Process and Mechanism". J. Phys. Chem. 111: 12012-12016, describes a nanoparticle synthesis protocol based on the reaction of elemental tellurium with the reducing agent $NaBH_4$, which produces NaHTe that in turn is used as tellurium donor. $CdCl_2$ is used as the $Cd^{+2}$ source and mercapto succinic acid to form a QDs-covering shell.

Finally, in this method temperatures of ~200° C. are required as well as autoclave pressures and the use of oxygen-free solutions (saturated with nitrogen).

As a difference with the protocol described in the current application, authors declare that one of the essential documents in the procedure deals with an agent, able to reduce elemental tellurium, which corresponds to $NaBH_4$, a feature that complicates the reaction conditions. As has been stated above, the current invention uses a reducing agent of very easy handling (glutathione) which also helps in covering the quantum dots. Finally, in the protocol described in the current invention, using high temperatures or pressures is not required in conjunction with no necessity of refluxing or condensation. It can also be carried out in the absence of oxygen.

Then, it is considered that the protocol of D4 document differs from that of the current application, being therefore novel.

Guo J., et al., (2005). "Systematic Study of the Photoluminescence Dependence of Thiol-Capped CdTe Nanocrystals on the Reaction Conditions". J. Phys. Chem. 109: 17467-17473, discloses a nanoparticle synthesis protocol with thiophycolic acid or 3-mercapto propionic acid, a procedure based in the $NaBH_4$-mediated tellurite reduction to produce NaHTe, which acts as tellurium precursor. Finally, it is stated that high pressure and temperature are required, as well as nitrogen-saturated solutions to achieve an efficient nanoparticle development.

As a difference with the protocol described in the current application, authors of D5 document state that one of the essential elements of the procedure deals with the use of $NaBH_4$ to reduce elemental tellurium, thus complicating reaction conditions. As a difference with this protocol, the current invention uses glutathione, which acts as a reducing agent and, at the same time, as a nanoparticle cap or cover the. Also, high pressure and temperature are not required nor strict working conditions to handle $NaHB_4$ or NaHTe. In this context, it is considered that the protocol described in D5 is different to the protocol of the current application, so it is considered novel.

Zheng Y., et al., (2007): "Synthesis and Cell-Imaging Applications of Glutathione-Capped CdTe Quantum Dots". Adv. Mater. 19: 376-380, requires generating the $H_2Te$. To do so, sulfuric acid drops are added over $Al_2Te_3$, generating $H_2Te$ gas, which is then bubbled through a solution that contains $CdCl_2$ and glutathione to produce the nanoparticles. In this protocol, the synthesis is conducted at pH 11.5 under argon. Very relevant data in the context of the procedure disclosed in D6, is the fact that the reactions are conducted under anaerobic conditions, and at temperatures equal or above 95° C.

Although GSH-capped CdTe QDs are obtained with both protocols, an important difference is the preparation method itself. The protocol referred in D6 considers the use of $H_2Te$ gas as a tellurium donor, which requires very strict handling conditions for Np development, including anaerobic conditions in parts of the protocol, high temperatures, and a strong basic pH (pH 11.5). In the current invention the tellurium donor used (sodium tellurite) does not require special treatment nor anaerobic conditions or high temperatures to generate CdTe nanoparticles. Furthermore, the pH in the synthesis may vary from pH 8.5 to 12.

Based on the above statements, it is considered that the protocol referred in D6 differs from that of the current application, being this therefore novel.

US 2008/0246006 (Agency for Science, Technology and Research) Abstract, describes a CdTe nanoparticle synthesis protocol, in which GSH-capped NPS are prepared by reacting sulfuric acid with $Al_2Te_3$, producing $H_2Te$ gas, the telluride donor. This gas is bubbled in a solution containing glutathione and $CdCl_2$ to generate nanoparticles. The reaction is conducted under anaerobic conditions at pH 11.5 and at temperatures equal or above 95° C.

Analysis: As a difference with the protocol described in the current application, authors of D7 document, state that the protocol considers using $H_2Te$ gas or NaHTe as the tellurium donor. In the case of $H_2Te$, it is indicated that very strict handling conditions for developing nanoparticles are required, including, anaerobic conditions as well as high temperatures. As a difference with the above, in the current invention a tellurium oxyanion is used as Te donor, whose handling does not require anaerobic conditions nor high temperatures to generate CdTe nanoparticles. Based on the above statements it is considered that the D7 document's protocol is different from the one included in the present application, and so novel.

Owing to this reason and considering the absence of a simple protocol for aqueous synthesis of CdTe nanoparticles related with the important biological thiol GSH, that described in the current application is actually a simple, versatile, economic, safe (less toxic), and highly reproducible method for CdTe-GSH nanoparticles synthesis in an aqueous media. Using a biological thiol as GSH, the quantum dots obtained offer a great potential in several applications, such as:

Bio-imaging generation, in vitro, as well as in vivo, since the QDs are able to be joined to different molecules, as proteins (antibodies and peptides ligands) and nucleic acids (aptamers and DNA or ARN molecules.—Due to a close relationship between structure and spectroscopic properties of these nanoparticles, they can be used in the detection and quantification of different types of molecules, which are able to interact with the thiol-groups of glutathione, located on the surface of these nanostructures (peroxides, thiols, discrimination between ions such as $Fe^{+2}$ and $Fe^{+3}$, $Cu^{+2}$, $Pb^{+2}$, glucose, among other ions and molecules). This effect is reflected through the displacement of the absorption spectra or fluorescence, which is directly related with the concentration of the detected species.

The QDs generated with this method can be used in devices comprising light emission (LEDs) (light emitting diodes) photovoltaic devices or optoelectronics, optical amplifiers, and other devices, etc.

The evaluation of differential expression of cell proteins, since total proteins obtained in a condition can be joined with a QDs having a color (for instance, green) and be compared with protein extracts which have been obtained under other condition (joined to QDs of another color (red).

The skilled person may understand other characteristics, uses, utilities, benefits, and advantages of the disclosed quantum dots that were not specifically mentioned, in this instant application.

BRIEF DESCRIPTION OF THE DRAWINGS

The patent of application file contains at least one drawing executed in color. Copies of this patent or patent application publication with color drawing(s) will be provided by the Office upon request and payment of the necessary fee.

A) Aliquots of the synthesis mixture of CdTe-GSH nanoparticles, taken at different times of reaction (0, 1, 3, 6, 12, 18 and 24 h of treatment at 60° C.).

B) Absorption spectra of the aliquots which have been obtained after at 1, 6, 12, 18 and 24 hours.

Figure 2:
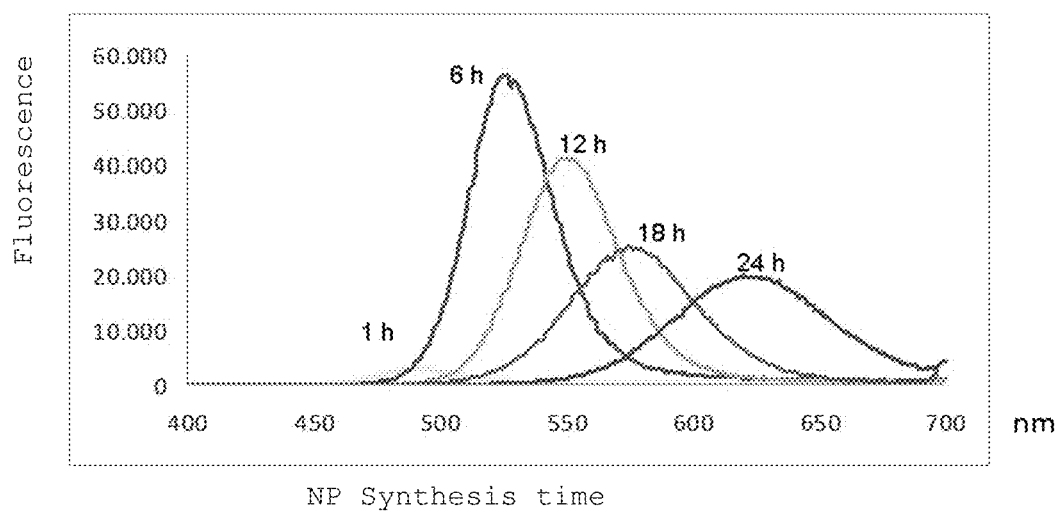

FIG. 2: Fluorescence spectrum of the nanoparticles present in aliquots obtained at different times.

Figure 3:
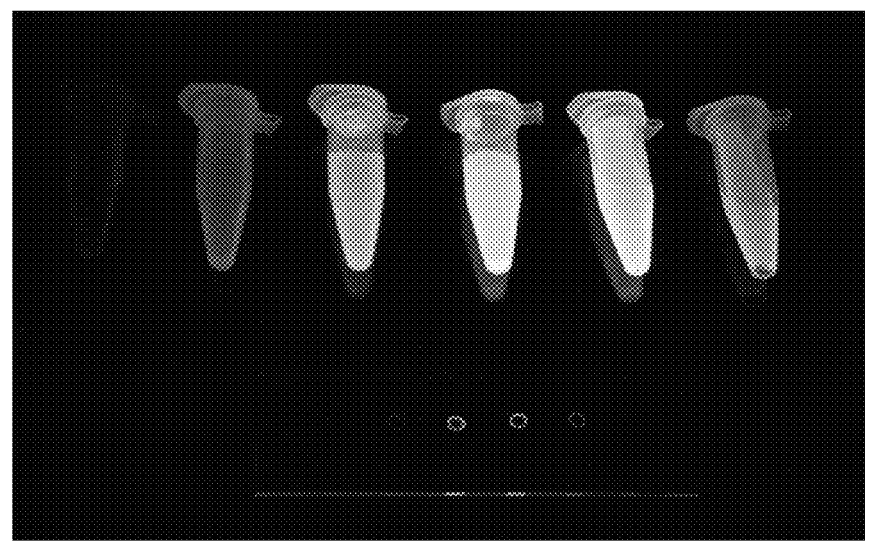

FIG. 3: Aliquots exposed to UV light (trans-illuminator).

Figure 4:
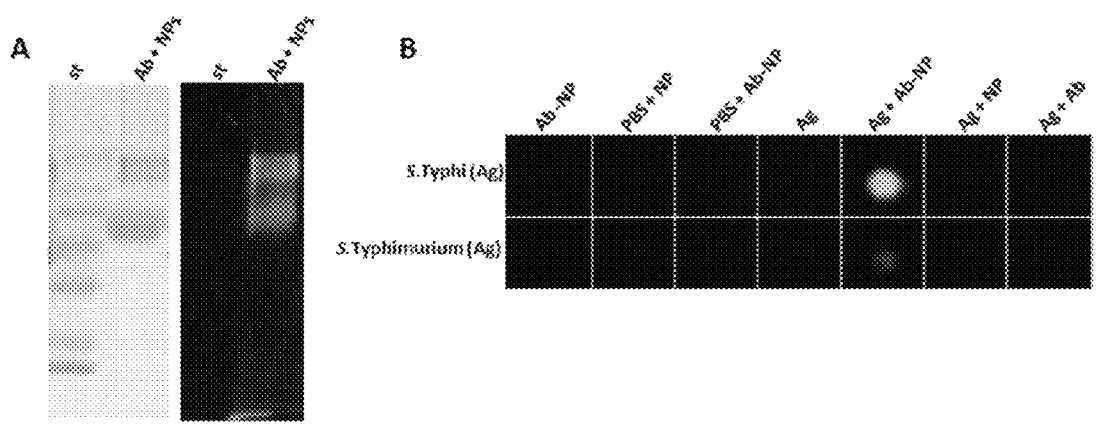

FIG. 4: SDS-PAGE of the anti S. Typhi antibody joined to CdTe-GSH revealed with Comassie blue or evaluated by fluorescence in an UV (A) transilluminator. A Dot-Blot was prepared with the Ab+NPs complex, and the microorganism were detected by forming the complex, and the fluorescence associated with it (B). As corresponds to the antigens to be detected (S. Typhi or S. Typhimurium), PBS is the saline phosphate buffer.

DETAILED DESCRIPTION OF THE INVENTION

The synthesis of nanoparticles (NPs) or quantum dots (QDs) of CdTe-GSH in aqueous phase is conducted following this protocol:

An aqueous $CdCl_2$ solution is prepared (it can be any other salt of $Cd^{+2}$ salt, such as cadmium sulphate, acetate or per-chlorate) up to a final concentration of 4 mM, in 50 ml 15 mM citrate buffer (it can be also Tris-HCl, phosphate, borax citrate Luria Bertani bacterial culture media or M9, among others), at pH9 (the pH may vary in the range of pH 9-13), at ambient temperature. M9 is a culture medium of microorganisms with the following composition:

For 1 L of M9 medium, salts 100 mL 10× autoclave ($Na_2HPO_4$ anhydrous 60 g, $KH_2PO_4$ 30 g, NaCl 5 g, NH4Cl 10 g in 1 L of nanopure water pH 7.2), nanopure sterile $H_2O$ 894 mL, $MgSO_4$*4 mL 7H2O, $CaCl_2$*0.1 mL 2H2O 1 M, glucose 20% 10 mL and hydrochloride thiamine 3 mL 0.1 M is required. $MgSO_4$*7H2O, $CaCl_2$*2H$_2$O, glucose and the hydrochloride thiamine are all previously sterilized with 0.2 μm filters under a laminar flow cabinet.

GSH up to a final concentration of 10 mM is added, under strong stirring or agitation (avoiding the forming of a white precipitate of Cd°).

After 5-10 minutes ( ) a tellurium oxyanion is added as $K_2TeO_3$ (or $Na_2TeO_3$) at a final concentration of 1 mM. The component ratio in the final synthesis mixture $CdCl_2$:GSH:$K_2TeO_3$ is 4:10:1, (however, the synthesis also allows other ratios as 1:2:1, and 6:10:1). At this stage, the solution turns to a light green color, which is indicative of the generation of the first nanoparticle "seeds", that will be able to start the nucleation of the QDs, and increasing their size as the treatment time increases.

To start the nucleation process (synthesis) of the QDs, the mixture should be heated up to 90° C. (T°); (the protocol is valid in the temperature range of 37-130° C.). The synthesis kinetic (velocity) of the QDs is proportional to the T° of the test: to a higher temperature (T°) corresponds a higher production kinetic of big sized QDs.

From this point onward, the color of the solution changes with time, and its spectroscopic properties (absorption and fluorescence) vary as a consequence of QDs formation At different times samples can be collected to obtain QDs having the desired color and/or size.

If the synthesis is conducted at 90° C., after 4 hours, the solution has presented different colors, and it stabilizes in a red color, which indicates the presence of the CdTe-GSH NPs of bigger size. The sizes of the QDs are comprised in the range of 2.5-3 nm diameter at the first time (green color) up to approximately 5-6.5 nm diameter for the red color suspension.

If the synthesis is conducted at lower temperatures, for example 60° C., after 2 h the solution is a green fluorescence, and after approximately 20 h it turns to a reddish color (during this time, the solution has changed to different colors, different levels and intensities of green, yellow and red; as it occurs in the system at 50° C.).

To stop the reaction it is necessary to reduce the temperature of the solution to 4° C. (keep the tubes in a glass case or in ice during at least 30 min). To maintain the properties of the synthesized QDs they should be stored at low temperature and in the dark. However, NPs which have been synthesized with this method, remain fluorescent for at least 6 months, when exposed to room temperature and/or to day light. To store and determine the mass of the synthesized QDs, it is possible to precipitate nanoparticles from the synthesis solution (or suspension) by treating it with 2 volumes of isopropanol and centrifuge during 20 min at 13,000× g. In this way, a highly fluorescent precipitate is obtained, which corresponds to CdTe-GSH QDs.

Characteristics of the QDs Generated According to this Protocol

Figure 1:
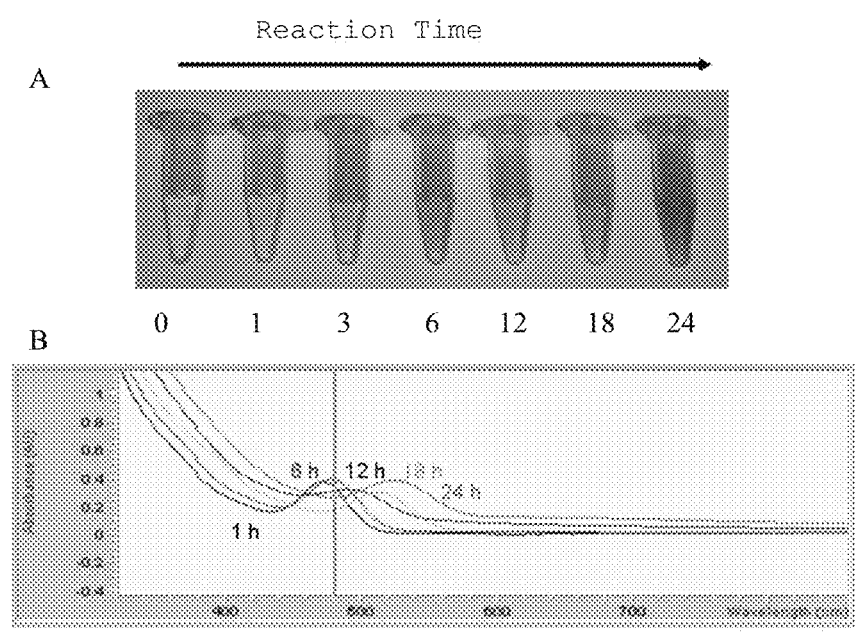
FIG. 1 shows the absorption spectrum of the QDs which have been generated by the method of the present application.

With this process it is possible to obtain CdTe-GSH nanoparticles with characteristic absorption and fluorescence spectra (see FIGS. 1 and 2, respectively). The synthesized QDs have an absorption that varies in the range of 450-560 nm, with emission in the range of 500 and 650 nm (in other synthesis protocols ranges between 520 and 620 nm have been reported). The absorption maximum has a width of approximately 40-50 nm, whereas the emission maximum is comprised between approximately 50-70 nm.

The quantum efficiency of the produced QDs, according to this protocol is approximately 25-30%, depending of the nanoparticle size, being similar with that described in other synthesis methods.

The composition of the nanoparticles was estimated by means of an EDAX analysis (Energy Dispersive X-Rays Analysis). It was determined that they contain approximately 35% C, 12% O, 15.5% N, 5% S, 23.6% Cd, and 72% Te. The C, O, N, and S contents are those expected for the QDs which comprise a tripeptide as GSH. The Cd:Te ratio: was 3.3:1, which agrees with that described for CdTe-GSH nanoparticles synthesized by other methods. Together with the above cited analysis, an Atomic Force Microscopy (AFM) analysis and Dynamic Light Scattering (DLS) determined that the size of the QDs vary between 3-6 nm. The green, yellow, and red QDs displayed diameters of approximately 3, 4.2, and 5 nm, respectively.

A direct application of these QDs, is their joining to a protein, particularly to antibodies, and their use in a one-step detection of specific antigens.

The CdTe QDs were synthesized at 60° C. during 6 h, by using 15 mM of citrate buffer, at pH 9.0, 1 mM $K_2TeO_3$, 4 mM $CdCl_2$ and 10 mM GSH, according to the previously described instructions.

The CdTe-GSH QDs were joined to the protein with the help of 2 imino thiolane. The protein was an antibody (Ab) recognizing the food-contaminating agent *Salmonella enterica* serovar *Typhimurium*. This complex Ab+NPs was used for detecting the pathogenic agent. FIG. 4 shows that Ab+NPs complex, fractionated by polyacrylamide gel electrophoresis (SDS-PAGE) under denaturing conditions stained with Comassie blue (4A) and revealed in an UV transluminator to determine protein fluorescence s (4 B). A Dot blot was made, using the Ab+NPS complex, and associated fluorescence was observed with the complex, specifically in those dishes where protein extracts of the microorganisms to be detected were added (FIG. 4B). This novel method, based on our QDs is highly specific and allows detecting antigens in only one step, since it does not require the use of secondary antibodies, nor developing solutions.

The invention claimed is:

1. A synthesis method in aqueous medium of cadmium-tellurium quantum dots joined with glutathione (CdTe-GSH), CHARACTERIZED in that it comprises the steps of:
   a. preparing an aqueous soluble cadmium salt solution in a buffer, the aqueous soluble cadmium salt solution having a pH of 9-13, the buffer being selected from the group consisting of a citrate buffer, a phosphate buffer, a Tris-HCL buffer, a Luria Bertani (LB) bacterial culture media buffer, and a MP buffer;
   b. adding glutathione (GHS) to the cadmium salt solution while applying agitation to from an agitated solution;
   c. adding a tellurium oxyanion as a tellurium donor, to the agitated solution of step b, the tellurium oxyanion being selected from the group consisting of sodium tellurite and potassium tellurite to from a composition;
   d. heating the composition from step c from 37° C. to 130° C. to from a reaction to provide a reactant solution;
   e. stopping the reaction by cooling the reactant solution to 4° C. to from a cooled solution; and
   f. incubating the cooled solution for at least 30 minutes.

2. The method according to claim 1, CHARACTERIZED in that in said step a, the cadmium salt in the aqueous soluble cadmium salt solution is selected from the group consisting of $CdCl_2$, $CdSO_4$ and $Cd(CH_3CO_2)_2$.

3. The method according to claim 1, CHARACTERIZED in that the composition of step c comprises $CdCl_2$:GSH:$K_2TeO_3$ at a ratio of 4:10:1.

4. The method according to claim 1, CHARACTERIZED in that in step d, the reaction time is not greater than 24 hours.

* * * * *